United States Patent [19]

Lawrence

[11] 4,413,845

[45] Nov. 8, 1983

[54] PIPE COUPLINGS

[75] Inventor: Anthony J. Lawrence, Teddington, England

[73] Assignee: Tungum Hydraulics Limited, Cheltenham, England

[21] Appl. No.: 199,016

[22] Filed: Oct. 20, 1980

[30] Foreign Application Priority Data

Oct. 18, 1979 [GB] United Kingdom ................. 7936130

[51] Int. Cl.³ ............................................. F16L 55/00
[52] U.S. Cl. ..................................... 285/23; 285/323; 285/368; 285/369; 285/383
[58] Field of Search ................. 285/323, 23, 322, 368, 285/339, 421, 412, 337, 354, 369, 348, 383

[56] References Cited

U.S. PATENT DOCUMENTS

| | | | |
|---|---|---|---|
| 1,851,574 | 3/1932 | Fiederlein | 285/412 X |
| 2,202,492 | 5/1940 | Jalocks | 285/383 X |
| 2,376,017 | 5/1945 | Smallpeice | 285/368 X |
| 2,459,956 | 1/1949 | Muller | 285/383 X |
| 2,557,495 | 6/1951 | Bily | 285/354 X |
| 2,819,099 | 1/1958 | Rittle | 285/323 X |
| 2,937,038 | 5/1960 | Gondek | 285/323 |
| 4,138,145 | 2/1979 | Lawrence | 285/323 |
| 4,138,147 | 2/1979 | Manchester | 285/323 X |

FOREIGN PATENT DOCUMENTS 584896 1/1947 United Kingdom ................ 285/368

*Primary Examiner*—Dave W. Arola
*Attorney, Agent, or Firm*—Young & Thompson

[57] ABSTRACT

A pipe coupling comprises a first pipe-encircling member having an outwardly extending peripheral flange, a sealing ring disposed within the first member to provide a seal between the member and a pipe, a second pipe-encircling member having an outwardly extending peripheral flange, a pipe-gripping collar within the second member having an external frusto-conical surface so arranged that, upon axial movement of the second member towards the first member, the collar is contracted radially to grip the pipe, and a number of axially extending clamping bolts passing through registering holes in the outwardly extending flanges, so that by tightening the clamping bolts the second member is moved axially towards the first member, causing the collar to grip the pipe, without relative rotation between the members.

5 Claims, 3 Drawing Figures

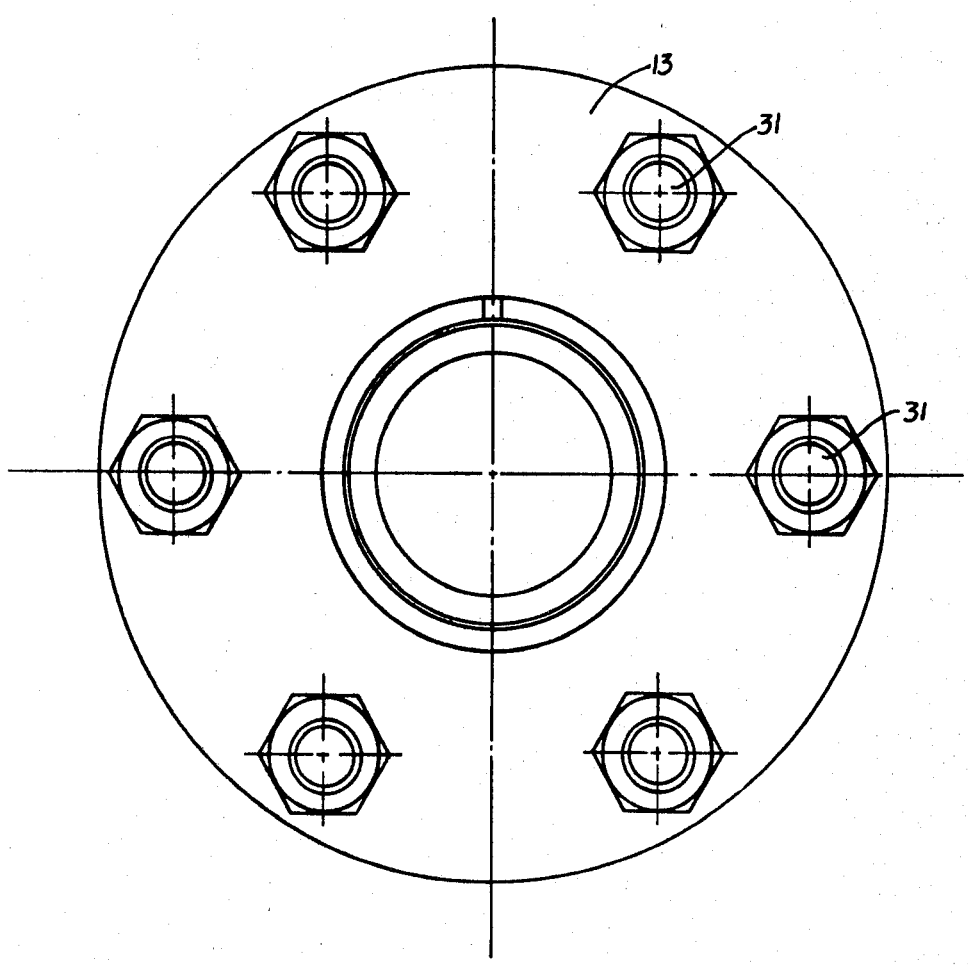

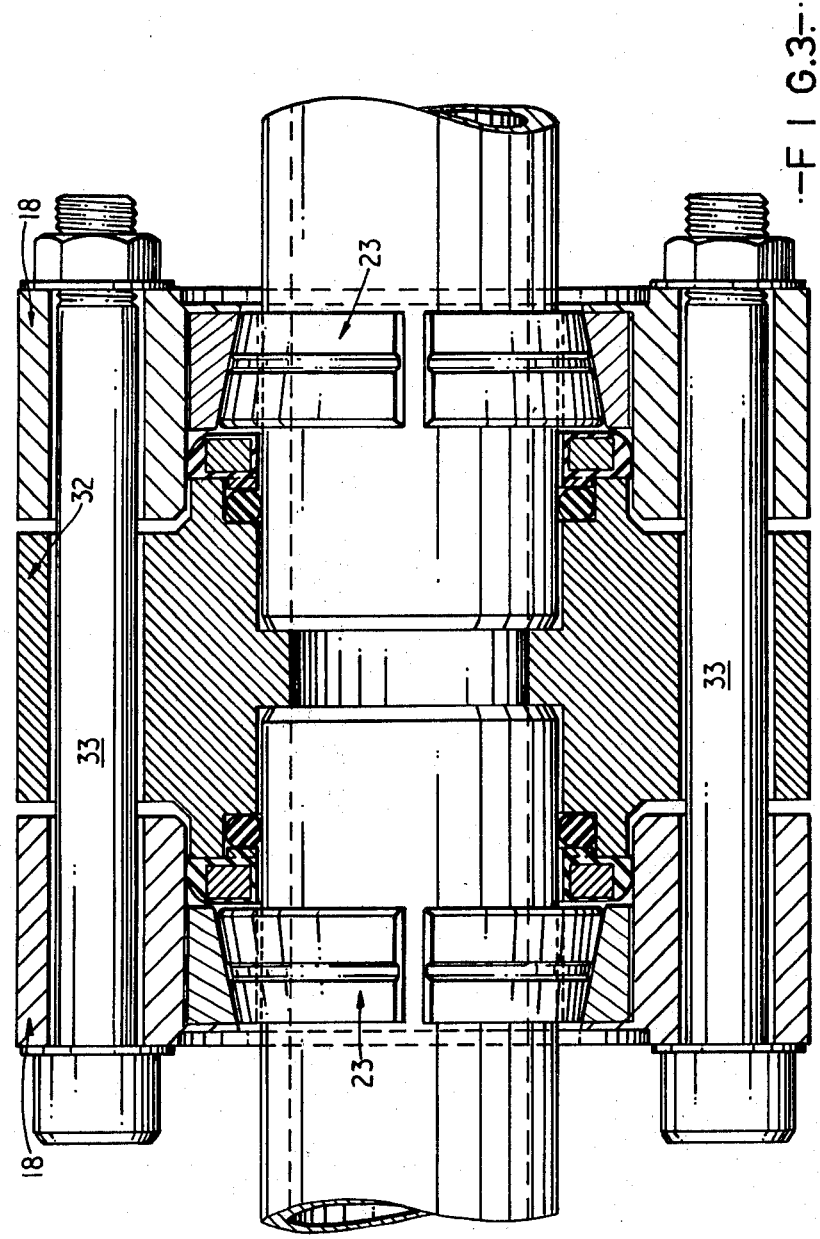

PIPE COUPLINGS

BACKGROUND OF THE INVENTION

The invention relates to pipe couplings of the kind comprising a first pipe-encircling member, a sealing element disposed within the first member to provide a seal between it and the pipe, a second pipe-encircling member, and a pipe-gripping collar within the second member having an external frusto-conical surface so arranged that, upon axial movement of the second member towards the first member, the collar is contracted radially to grip the pipe.

Hitherto, in pipe couplings of this type the movement of the second member towards the first member has been effected by the two members being in screw-threaded engagement so that relative rotation between them affects the necessary axial movement of the second member. The membes are normally of hexagonal shape so that they may be securely gripped by spanners to effect the necessary relative rotation.

While such a screw-threaded arrangement is suitable for pipes of comparatively small diameter where there is easy access to the coupling, difficulties arise with pipes of larger diameter and in cases where access to the pipe coupling is restricted. In the former case large spanners are required and in either case there may be difficulty in obtaining the necessary free movement of the spanner to achieve the rotation of the coupling members. Because of these disadvantages there are certain situations, such as on board ship, where couplings of the type first referred to are not use in spite of the advantages which they may provide in other respects. The invention sets out to provide a form of coupling in which the above disadvantages may be overcome.

SUMMARY OF THE INVENTION

According to the invention there is provided a pipe coupling comprising a first pipe-encircling member having an outwardly extending projection, a sealing element disposed within the first member to provide a seal between the member and a pipe, a second pipe-encircling member having an outwardly extending projection, a pipe-gripping collar within the second member having an external frusto-conical surface so arranged that, upon axial movement of the second member towards the first member, the collar is contracted radially to grip the pipe, and adjustable clamping means engageable with said projections on the first and second members to move the second member axially towards the first member without relative rotation between the members.

For example, the clamping means may comprise a number of axially extending clamping bolts passing through registering holes in the outwardly extending projections.

In a preferred embodiment of the invention, at least one of said outwardly extending projections comprises a peripheral flange extending around the pipe-encircling member on which it is provided.

Where the purpose of the coupling is to connect an end fitting to the pipe, the first member may have means for connecting the fitting to it, or may itself comprise a part of the fitting. Where the pipe coupling is for connecting two pipes together, there may be provided two similar but opposed second pipe-encircling members the pipe-gripping collars of which are arranged to grip the adjacent ends of two pipes to be joined, a single first pipe-encircling member being disposed between the second members and the clamping means being arranged to move both second members axially towards the first member between them. In this case, where the clamping means comprise clamping bolts, each clamping bolt may pass through registering holes in the outwardly extending projections on both second members and on the first member.

A slip ring may be located within a bore of the second member against an internal shoulder thereof and having an internal frusto-conical surface which co-acts with the external frusto-conical surface of the pipe-gripping collar. Such a slip ring serves to prevent the collar becoming jammed within the second member, upon axial movement thereof, which could otherwise make the coupling difficult to take apart.

There may be provided a washer having one side in surface-to-surface engagement with an end surface of the pipe-gripping collar and the other side in surface-to-surface engagement with the first pipe-encircling member. The washer may have a peripheral resilient flange for engagement within the second member to retain the collar, and the slip ring where such is provided, within the second member.

The flange may be of rubber and firmly bonded to a metal body of the washer. For example, the flange may be a portion of a body of rubber encapsulating the washer.

The washer may carry a resilient backing ring which cooperates, in use, with the sealing element to prevent extrusion of the material of the sealing element under high pressure conditions. The backing ring may be integral with the rubber body of the washer or may be bonded to the washer.

Preferably the pipe-gripping collar is longitudinally split and has a circumferential groove in the external frusto-conical surface thereof to provide relief between the collar and the slip ring.

BRIEF DESCRIPTION OF THE DRAWINGS

FIG. 2 is an end elevation of the pipe coupling shown in FIG. 1, and

FIG. 3 is a sectional view of an alternative form of coupling for use in connecting two pipes together.

DETAILED DESCRIPTION OF THE PREFERRED EMBODIMENTS

Figure 1:
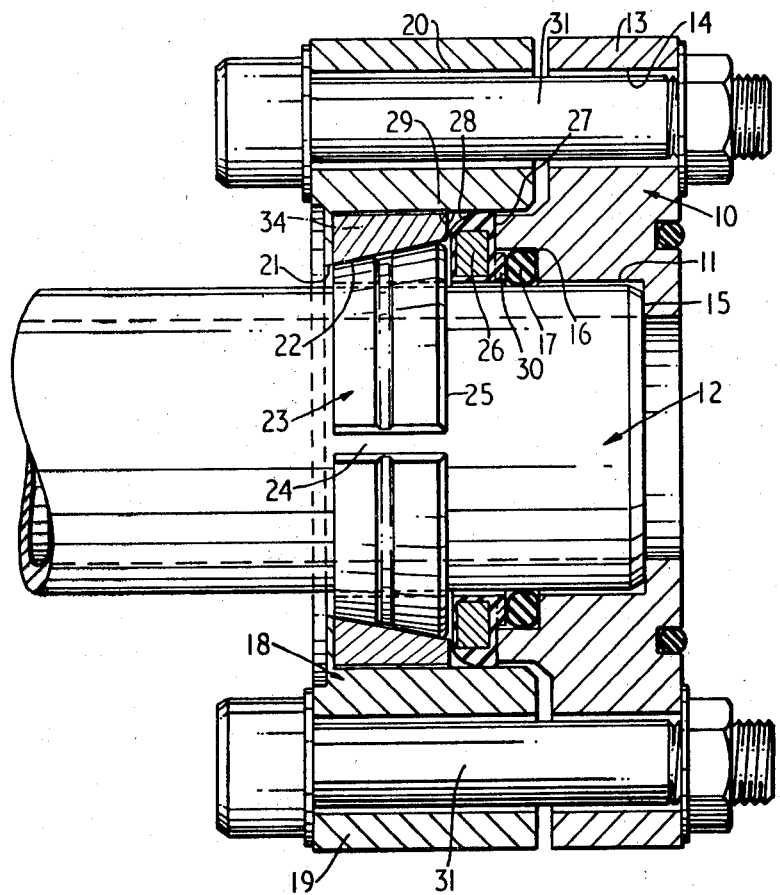
FIG. 1 is a sectional view of a pipe coupling.

Referring to FIG. 1, the coupling includes a first pipe-encircling member 10 having a stepped through-bore 11 to receive the end of a pipe 12. The member 10 is formed with an outwardly projecting circular peripheral flange 13 formed with six equally spaced axial holes 14. The member 10 is provided with means, not shown, for mounting it on a fitting which requires to be connected to the pipe 12 or, alternatively, the member 10 may be an integral part of a fitting which is to be connected to the pipe 12.

A shoulder 15 at the junction between two different diameter portions of the stepped bore 11 acts as a stop to limit the distance by which the pipe 12 can be inserted into the bore 11. The inner end of the member 10 is counterbored to provide a recess 16 in which a resilient O-ring 17 is housed, the relative dimensions of the recess 16 and O-ring 17 being such that the O-ring is an interference fit radially with respect to the wall of the recess 16 to provide an effective seal against internal hydraulic pressure.

A second pipe-encircling member 18 encircles the pipe 12 inwardly of the member 10 and is formed with an outwardly projecting circular peripheral flange 19 which is formed with six equally spaced axial holes 20 in register with the holes 14 on the member 10.

The member 18 is formed with an internal frusto-conical wedge surface 21 having a taper of approximately 11° and facing towards the pipe 12. The surface 21 engages a complementary wedge surface 22 on an annular pipe-gripping collar 23 which surrounds the pipe 12. The collar 23 is longitudinally split throughout its length as indicated at 24, and has a flat end surface 25 which engages an annular metal thrust washer 26 of rectangular section which closely encircles the pipe 12 and abuts an end face 27 of the pipe-encircling member 10. The thrust washer 26 thus serves to close the open end of the recess 16 in which the O-ring 17 is housed and prevents the adjacent split end of the collar 23 damaging the member 10.

A peripheral, resiliently deformable flange 28 is provided around the thrust washer 26, the flange 28 forming part of a body of natural or synthetic rubber encapsulating the thrust washer 26. The flange 28 engages a surrounding bore 29 in the member 18.

The thrust washer 26 also carries a backing ring 30 which is a close fit in the mouth of the recess 16. The backing ring 30 is formed of synthetic rubber and is bonded to, or integrally formed with, the body of rubber encapsulating the thrust washer 26. The backing ring 30 has a hardness greater than that of the O-ring 17 and serves to prevent extrusion of the material of the O-ring into the junction between the thrust washer 26 and the member 10.

To assemble the coupling, the pipe-gripping collar 23 is introduced within the frusto-conical surface 21 of the member 18 and the thrust washer 26 is introduced into the bore 29. The peripheral flange 28 of the thrust washer is deformed as the washer is pressed into the bore 29, and the thrust washer is thus retained in the bore and acts as a holding member to hold the collar 23 in position within the member 18. The assembly comprising the member 18, collar 23 and washer 26 can then be used as a preassembled coupling member capable of use, storage and transport as a one-piece assembly. In like manner the O-ring 17 is held resiliently within the recess 16 of the member 10 so that each of the members of the coupling can be provided in unitary form.

When both coupling members have been assembled as shown on the end of the pipe 12, clamping bolts 31 are introduced through the registering holes 14 and 20 in the flanges of the coupling members, and are tightened up so as to force the second member 18 axially towards the first member 10 without rotation of either member. This axial movement of the member 18 causes the collar 23 to be contracted, under the action of the engaging wedging surfaces 21 and 22, so as to grip the pipe 12.

Since the necessary axial movement of the member 18 is effected by tightening up the clamping bolts 31 and not by rotation of the whole pipe-encircling member, as has been the case in previous screw-threaded couplings of this type, the coupling can be fitted in locations where access and space is limited.

It will be appreciated that it may be convenient to use other forms of clamping means, instead of bolts 31, to move the coupling member 18 towards the coupling member 10, and in this case it may be appropriate for the peripheral flanges 13 and 19 to be replaced by some other form of outwardly extending projection. For example, each flange might be replaced by one or more outwardly extending lugs which are engaged by the clamping means.

In previously known couplings where the two coupling members are in screw-threaded engagement, it has been necessary for the frusto-conical wedging surface which engages the collar to be provided on a separately formed slip ring mounted within the rotatable coupling member. The provision of such a slip ring is necessary to prevent or reduce the transmission of torque from the coupling member to the pipe-gripping collar. Since, in the present coupling, the coupling member moves axially without rotation, the slip ring could be omitted, permitting the manufacture and assembly of the coupling to be simplified. However, since such a slip ring may also serve to prevent the collar 23 becoming jammed within the coupling member 18, due to the axial movement of that member, it may still be desirable to provide a slip ring in the coupling according to the present invention, and the location of the slip ring is indicated at 34 in FIG. 1.

FIG. 3 shows a modified form of pipe coupling for connecting two pipes together. In this case there are provided two similar but opposed second pipe-encircling members 18, the pipe-gripping collars 23 of which are arranged to grip the adjacent ends of the two pipes to be joined. A single first pipe-encircling member 32 is disposed between the members 18, the member 32 consisting essentially of two of the above-described members 10 integrally formed back to back. In this case the clamping bolts 33 are long enough to pass through registering holes in both the members 18 and the member 32 between them. As the bolts are tightened up the two members 18 are moved axially towards one another and the two pipe-gripping collars 23 are contracted to grip the two pipes respectively as described above in relation to the arrangement of FIG. 1.

Although in the arrangement of FIG. 3 the member 32 is a unitary component, it will be appreciated that a component corresponding to the member 32 could be provided by mounting two of the above-described members 10 back to back with a resilient sealing ring between them.

I claim:

1. A pipe coupling comprising a first pipe-encircling member having a bore therein adapted to receive the pipe and having an outwardly extending projection, a recess coaxial with said bore and a sealing element disposed within the recess and of said first member to provide a seal between the member and a pipe, a second pipe-encircling member having an internal bore provided with an internal shoulder and an outwardly extending projection, a pipe-gripping collar within the bore in the second member and having an external frusto-conical surface so arranged that, upon axial movement of the second member towards the first member, the collar is contracted radially to grip the pipe, adjustable clamping means engageable with said projections on the first and second members to move the second member axially towards the first member without relative rotation between the members, a slip ring located within the bore of the second member against the internal shoulder of said second member and having an internal frusto-conical surface which coacts with the external frusto-conical surface of the collar, a washer having one side in surface-to-surface engagement with an end surface of the collar and the other side in surface-to-surface engagement with the first pipe-encircling member, the washer having a metal body, a body of rubber encapsulating the metal body of the washer, a peripheral rubber flange integral with said encapsulating body of rubber for engagement with the bore in said second member to retain the collar and the slip ring within the bore of the second member, and a resilient rubber backing ring integral with said encapsulating body of rubber which extends into and cooperates, in use, with said recess and the sealing element to prevent extrusion of the material of the sealing element under high pressure conditions.

2. A pipe coupling according to claim 1, wherein the clamping means comprise a number of axially extending clamping bolts passing through registering holes in the outwardly extending projections.

3. A pipe coupling according to claim 1, wherein at least one of said outwardly extending projections comprises a peripheral flange extending around the pipe-encircling member on which it is provided.

4. A pipe coupling according to claim 1, wherein the first pipe-encircling member has means for connecting a fitting to it.

5. A pipe coupling according to claim 1, wherein the first pipe-encircling member comprises a part of a fitting.

* * * * *